United States Patent [19]

Weckesser et al.

[11] 4,065,271

[45] Dec. 27, 1977

[54] PROCESS OF SEPARATING HYDROGEN FLUORIDE FROM GASES

[75] Inventors: Ernst Weckesser; Volker Sparwald, both of Grevenbroich; Lothar Reh, Bergen-Enkheim; Eberhard Böhm; Rolf Graf, both of Frankfurt am Main, all of Germany

[73] Assignees: Metallgesellschaft Aktiengesellschaft, Frankfurt am Main; Vereinigte Aluminium-Werke AG, Bonn, both of Germany

[21] Appl. No.: 621,604

[22] Filed: Oct. 10, 1975

Related U.S. Application Data

[63] Continuation of Ser. No. 488,930, July 19, 1974, abandoned.

[30] Foreign Application Priority Data

Sept. 15, 1973 Germany .............................. 2346580

[51] Int. Cl.² .......................... B01D 53/12; B03C 3/00
[52] U.S. Cl. ............................................. 55/2; 55/71; 55/77
[58] Field of Search ................. 55/2, 71, 77, 101, 390

[56] References Cited

U.S. PATENT DOCUMENTS

| 3,477,203 | 11/1969 | Luge et al. ................................. 55/9 |
| 3,780,497 | 12/1973 | Muhlrad ................................. 55/71 |

OTHER PUBLICATIONS

Belco Bulletin No. 172-68, Electric Precipitators, "A Better Solution to Air Pollution."

Primary Examiner—Frank A. Spear, Jr.
Assistant Examiner—Richard W. Burks
Attorney, Agent, or Firm—Karl F. Ross

[57] ABSTRACT

Hydrogen fluoride is removed from gases by introducing the gases into a fluidized-bed reactor to form a gas-solid suspension, entraining a major part of the solids in an upward direction separating the solids entrained by the gases without prior removal of the solids from the gas-solid suspension, by means of an electrostatic precipitator.

7 Claims, 2 Drawing Figures

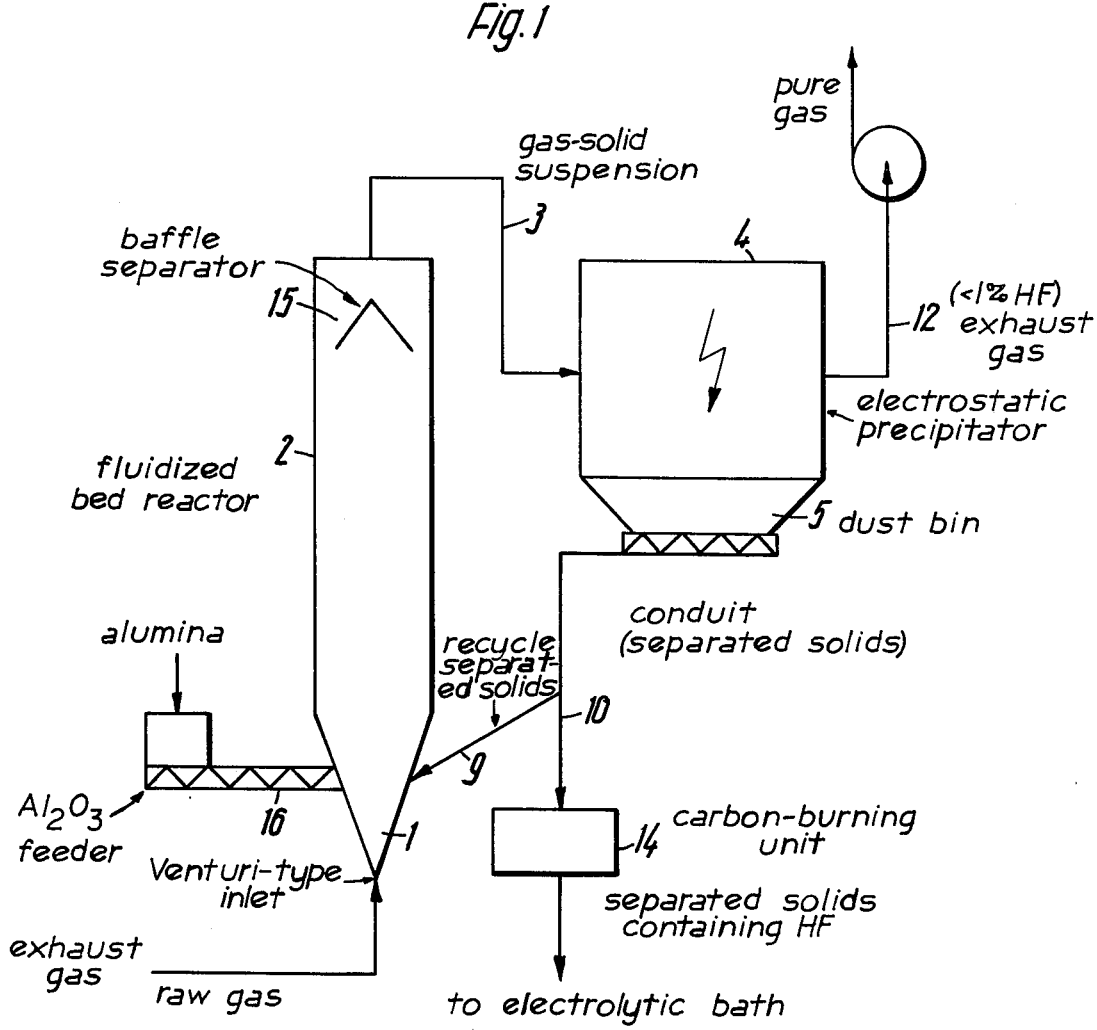

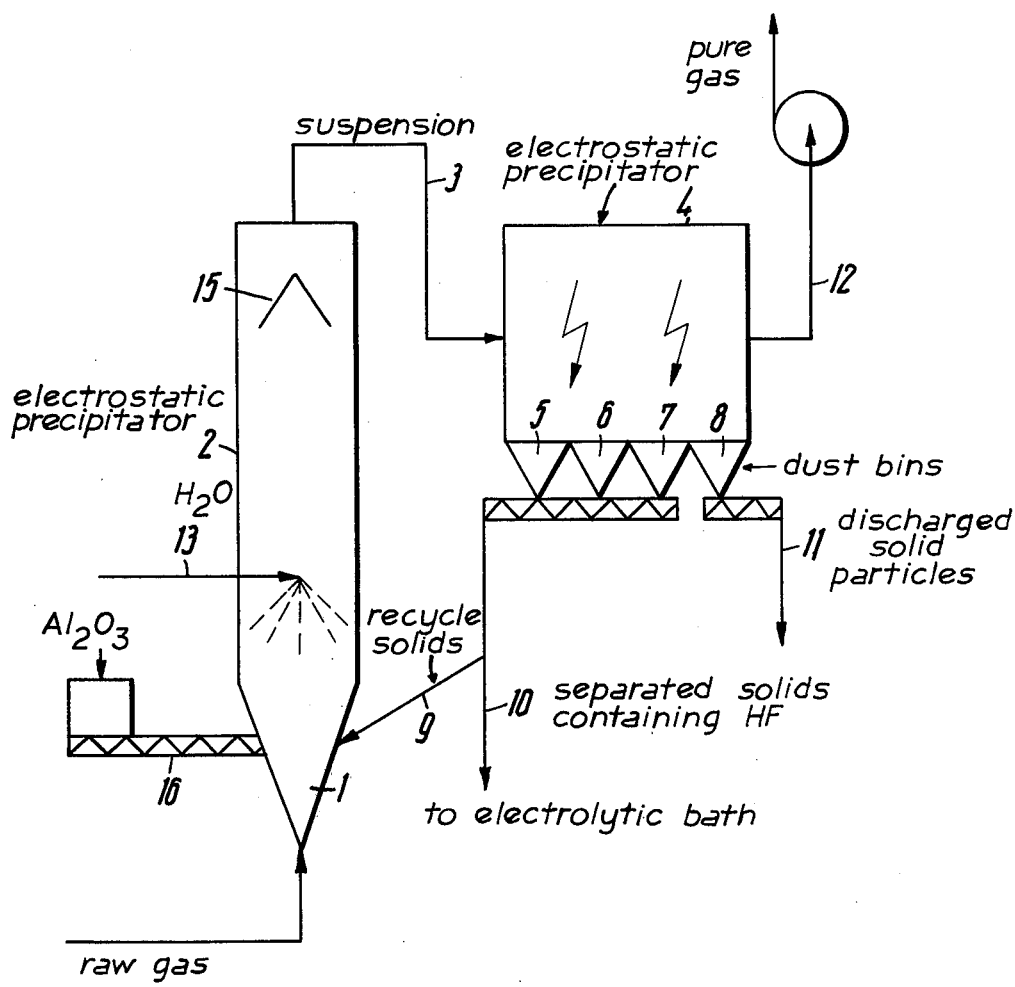

PROCESS OF SEPARATING HYDROGEN FLUORIDE FROM GASES

CROSS REFERENCE TO RELATED APPLICATIONS

This application is a continuation of Ser. No. 488,930 filed July 19, 1974 (now abandoned) and is related to commonly assigned application Ser. No. 198,768 filed November 15, 1971 (now U.S. Pat. No. 3,907,971) by several of the present joint inventors.

FIELD OF THE INVENTION

This invention relates to a process of separating hydrogen fluoride from gases with the aid of fluidized solids (adsorbents), in which the gases which contain hydrogen fluoride are introduced as a fluidizing gas into a fluidized-bed reactor at such a velocity that the gas and solids form a fluidized bed which has a very low density and in which the solids concentration decreases from bottom to top.

A problem which often arises in technology is to remove components from gases, whether for a recovery for economical reasons or to avoid a pollution of the environment. The removal may be accomplished by wet methods, such as scrubbing, or by dry solids involving a separation by means of solids.

A special problem is the removal of hydrogen fluoride from exhaust gases. As a result of the use of complex fluorides, such as cryolite, as a flux in the electrolytic process of producing aluminum, the exhaust gases contain per standard cubic meter up to 1000 milligrams HF, depending on the method of suction and the dilution, and as a rule contain less than about 100 milligrams HF.

In addition to the above-mentioned wet scrubbing process, various dry adsorption processes are known for a removal of hydrogen fluoride so as to avoid the corrosion problems which are involved in wet scrubbing processes.

Application Ser. No. 198,768 is based upon our surprising discovery that the efficiency of removal of hydrogen fluoride from a gas stream containing same can be sharply increased to a qualitative improvement over prior-art systems when the contact between the gas phase and the solid phase is carried out in an expanded fluidized bed, i.e., a fluidized bed in which a substantially uniform gradient of solids concentration or density is maintained between the floor of the fluidized bed and the gas outlet therefrom, preferably throughout the height of the chamber, such that no sharp demarcation exists between a fluidized-bed layer and a free space above this bed, the gas flow being such that the major proportion of the solids removed from the expanded fluidized bed is entrained by the gases, separated therefrom by centrifugal and sedimentation processes and recycled to the fluidized bed.

Surprisingly, good adsorption results can be obtained with high gas throughputs if the fluidized-bed contact between the gas stream and the solid particles is controlled such that the gases which contain hydrogen fluoride are injected into the fluidized-bed reactor as the fluidizing gas and at such velocity that the gas causes the solids to form a loose or expanded fluidized bed in which the solids concentration decreases upwardly over substantially the entire height of the fluidized-bed chamber and at least between the floor of the fluidized bed and the gas outlet, while the solids are mainly discharged from the chamber by the upwardly moving stream of gas.

Reference to an "expanded" or "loose" fluidized bed, means one in which a more or less uniform gradient of solids concentration or solids density is maintained from the gas outlet above the bed to the aperture floor of the chamber through which the fluidizing gas is introduced. Preferably the fluidized bed has a height or thickness which is at least equal to the major horizontal dimension and preferably is several times the major horizontal dimension. The expanded bed, moreover, has no sharp boundary between free space and a layer of the solid material. Finally, in this connection the major portion of the solids is removed upwardly by entrainment with the gases and also recirculation of the major proportion of the solids removed during any unit time of operation of the apparatus, to the fluidized bed. This means that, while solids may be continuously supplied to the bed and a corresponding quantity of solids removed, e.g., by mechanical means at a point intermediate the floor and the gas outlet, a larger quantity of the solids is simultaneously entrained with the gas stream and is carried thereby from the fluidized-bed reactor into a gas/solid separating apparatus from which the gases are discharged and the solids recycled to the fluidized-bed chamber. Moreover, the feed of fresh solids to the fluidized bed and withdrawal of a corresponding quantity of solids containing hydrogen fluoride, can be carried out intermittently while recirculation of solids is carried out continuously. During any operation period including replenishment and discharge of solids and recirculation, therefore, we have found it advantageous that the total quantity of recirculated solids should exceed the solids discharged from the fluidized bed. If the total quantity by weight of recirculated solids over a period $t$ is represented by Q, the recirculation of velocity may be represented by $V = Q/t$. If the quantity of solids discharged during this period is represented by $q$, the average discharge rate $v = q/t$ and $Q/(Q + q) > 0.5$. The sum $S = = Q + q$ represents the total solids discharged from the bed within time $t$. Where discharge of solids is not continuous, the instantaneous value $v$ of such discharge may exceed V as long as the other conditions set forth above are maintained.

The solids which are employed may be any adsorbent capable of interaction with and having an affinity for the gas component to be removed and in case of hydrogen fluoride may be any of the adsorbents noted above. Preferably, the compound is an oxide which, upon adsorption of hydrogen fluoride can be incorporated in the electrolysis bath for the production of aluminum.

In a preferred embodiment of the invention, the solids are relatively fine-grained with an average particle size of 20 to 300 microns while a gas velocity through the bed is 1 to 5 meters/second. The residence time of gas in the fluidized bed is thus about 1 to 15 seconds. The preferred particulate solids are fine-grained calcinated alumina and sodium aluminate which may be used individually or in mutual admixture in any proportions. The temperature at which adsorption is carried out is preferably maintained at a temperature of 50° to 100° C.

With the aforedescribed parameters, alumina produced by the BAYER process and calcined in a fluidized bed was used to adsorb hydrogen fluoride from exhaust gases containing 20 to 50 mg of hydrogen fluoride/m³ (standard temperature and pressure = STP) of gas discharged from an electrolysis plant in the production of aluminum. The gas was purified to residual HF content of less than one mg/m³ (STP).

The process is especially advantageous when the solid adsorbent is not regenerated but passes through the fluidized-bed reactor only once, i.e., is not returned to the reactor after discharge in the quantity $q$ mentioned earlier. This product can then be used directly in the electrolysis bath. The use of solids which remove hydrogen fluoride from the effluent gases of an aluminum production plant and then are introduced directly into the electrolytic cells thereof, has considerable advantages, apart from yielding a low residual HF concentration in the effluent gases. Thus almost all of the hydrogen fluoride in the exhaust gas is recovered and recycles together with the oxide to the electrolysis bath, thereby reducing consumption of flux for electrolysis. Also the recovered hydrogen fluoride is uniformly distributed in the oxidic materials charged in the bath.

OBJECTS OF THE INVENTION

The principal object of this invention is to improve upon the system described above and more economically and efficiently remove HF from a gas containing same.

Another object of the new invention is to provide a method wherein HF can be virtually quantitatively removed from a gas.

SUMMARY OF THE INVENTION

It has now been found that the advantageous process of the prior application can be substantially improved in that solids entrained by the gases are collected in an electrostatic precipitator directly following the fluidized bed and without intervening separation of solids.

Whereas the use of an electrostatic precipitator for collecting the fine fractions is already contemplated in the process according to the earlier application it was certainly not to be expected that said solids which are suspended with a high density and entrained by the gases from the fluidized-bed reactor can be virtually quantitatively separated by means of an electrostatic precipitator alone. The use of an electrostatic precipitator for separating the solids discharged by the gases affords the advantage that the system consisting of an absorber and separator operates with a lower pressure loss than has been known before so that the operating costs can be much reduced, particularly when large gas rates are to be handled.

In a preferred embodiment of the invention the gas-solids suspension is conditioned with water to a dust resistivity below $10^{12}$ ohm-cm, preferably below $10^{11}$ ohm-cm. Under unusual atmospheric conditions the suspension may inherently have the water content required for this purpose. In general, the required dust resistivity will be obtained only if water or water vapor is supplied at a suitable point. It is particularly suitable to supply water directly into the fluidized-bed reactor. Surprisingly the supply of water and/or water vapor does not adversely affect the adsorption of hydrogen fluoride. This fact is surprising because it normally would be feared that water would highly reduce the adsorptive capacity of the solids for hydrogen fluoride so that a final gas having the required purity could not be obtained.

To ensure a sufficiently high loading of the solids with hydrogen fluoride it is suitable to recycle the separated solids into the fluidized-bed reactor so as to form a circulating fluidized bed. Feeders known per se may be used to recycle the solids into the fluidized-bed reactor. It is particularly desirable to feed the solids pneumatically.

In the main field of application of the present invention, namely, the separation of hydrogen fluoride from exhaust gases from the electrolytic production of aluminum using molten flux, the solids consist usually of alumina and/or sodium aluminate and the exhaust gas always contains impurities which are separated together with the solids used to adsorb hydrogen fluoride. The impurities in the exhaust gas may be in the form of a gas or vapor or small solid particles. These impurities may consist of, e.g., carbon, sulfur, iron, silicon, phosphorus and/or vanadium and/or compounds of these elements. Such impurities will give rise to difficulties if they are recycled together with the laden solids to the electrolytic process using molten flux and are enriched in the electrolyte. They contaminate the molten aluminum metal and reduce the current efficiency of the electrolytic furnace.

To avoid these difficulties it is a further desirable feature of the invention to separate the solids into fractions differing in particle size in an electrostatic precipitator provided with a plurality of fields and dust bins. A major part of the impurities is contained in a concentration which is three or more times higher in the fine-grained fraction which has been separated by the electrostatic precipitator and they can be discharged separately from the coarse-grained fractions. The fine-grained fraction may be discarded or may be subjected to suitable processing, e.g., for a recovery of the solids (adsorbent).

According to a preferred feature of the invention in conjunction with a fractionating separation of the solids the coarse-grained solids fraction is recycled into the fluidized-bed reactor so as to form a circulating fluidized bed and thus to ensure a sufficiently high loading with hydrogen fluoride.

It is desirable to feed solids having mean particle sizes of 20–300 microns and in that case to adjust the velocity of gas in the fluidized bed to 1–5 meters per second. In such a case, the mean residence time of the gas in the fluidized-bed reactor is about 1–15 seconds.

Most favorable conditions as regards the separation temperature will be obtained in the electrostatic precipitator if the temperature of the gas-solid suspension is adjusted to a value in the range of 40°–85° C. Whereas temperatures above 220° C may also be used, on principle, they are not significant because the exhaust gases to be treated according to the invention are not usually available at such high temperatures.

The pressure loss caused by the system which consists of the fluidized-bed reactor and the electrostatic precipitator may be further decreased if, according to a desirable feature, the exhaust gases which contain hydrogen fluoride are introduced into the fluidized-bed reactor through one or more inlets similar to Venturi tubes.

The contract between the exhaust gas and solids may be improved and the residence time of the solids and their loading with hydrogen fluoride may be increased if a baffle separator having a low pressure loss is incorporated in the fluidized-bed reactor. This does not decrease the throughput rate of the process.

The invention enables a variation of the mean concentration of solids in the shaft of the fluidized-bed reactor, and of the materials exchange surface area which has been presented, within wide limits by a controlled feeding and recycling means and a controlled discharge of solids. For instance, with respect to the pressure loss of the system favorable mean solids concentrations in the range from 2 to 10 kilograms per cubic meter of the reactor volume may be adjusted. The quantity of solids recirculated per hour may be five times the quantity of solids contained in the shaft of the fluidized-bed reactor.

BRIEF DESCRIPTION OF THE INVENTION

The invention will be explained more fully with reference to the accompanying drawings and Examples. In the drawing FIG. 1 is a flow scheme illustrating the removal of hydrogen fluoride from the exhaust gases from an electrolytic process; and FIG. 2 is a flow scheme illustrating the removal of electrolytic-process exhaust gases with an electrostatic precipitator having a plurality of fields and of dust bins.

SPECIFIC DESCRIPTION

The fine-grained adsorbent is fed by a feeder 16 into the fluidized-bed reactor. Raw gas is introduced by the gas distributor 1 into the vertical shaft 2 and as a fluidizing gas flows through the adsorbent at such a high velocity that a gas-solid suspension is formed in the fluidized-bed reactor throughout the height thereof. The residence time of the solids will be increased if a baffle separator 15 is incorporated. The concentration of the adsorbent decreases from bottom to top in the fluidized-bed reactor. A major portion of the adsorbent is discharged through the suspension outlet 3 and is separated in the succeeding electrostatic precipitator 4 and collected in the dust bin 5, from which the adsorbent is partly recycled through the conduit 9 into the fluidized-bed reactor and partly supplied through conduit 10 to the electrolytic unit (e.g., and aluminum-production cell). Before entering the electrolytic cell, the solid passes through a unit 14, which serves mainly to burn carbon.

The exhaust gas from which hydrogen fluoride has been removed leaves the electrostatic precipitator 4 through an exhaust conduit 12.

Different from FIG. 1, the process illustrated in the flow scheme in FIG. 2 comprises a separation of the solids into fractions differing in particle size, which are collected in dust bins 5, 6, 7, and 8. The fine-grained fraction collected in the dust bin 8 is discharged through conduit 11 and is, e.g., discarded. The solids collected in the dust bins 5, 6, and 7 are partly recycled through conduit 9 into the fluidized-bed reactor and partly supplied through conduit 10 to the electrolytic bath.

In the embodiment of the invention shown in FIG. 2, a supply of water through conduit 13 into the fluidized-bed reactor 2 is contemplated in order to condition the solid-gas suspension so as to provide for optimum conditions for the separation in the electrostatic precipitator.

SPECIFIC EXAMPLES

EXAMPLE 1 (with reference to FIG. 1)

The experiment was carried out with a fluidized-bed reactor 2 which was 0.88 meter in diameter in its cylindrical portion and had a height of 6 meters. The electrostatic filter 4 comprised a single field and a dust bin 5.

The solids consisted of $Al_2O_3$ which had an ignition loss of 1% by weight and had been produced by calcination in a fluidized bed. The solids had a surface area (BET) of about 25 square meters per gram and a mean particle diameter of 40 microns.

The exhaust gas contained 25 milligrams hydrogen fluoride per standard cubic meter and was at a temperature of 75° C. It was fed at a rate of 5000 standard cubic meters per hour into the fluidized-bed reactor through an inlet to a Venturi tube. 6 kilograms $Al_2O_3$ per hour were fed by the feeder 16. The gas rate in the fluidized-bed reactor corresponded to a gas velocity of 2.7 meters per second in the empty reactor. A gas-solid suspension containing 250 grams solids per standard cubic meter of gas was withdrawn through the suspension outlet 3 and fed to the electrostatic precipitator 4. Solids at a rate of 1250 kilograms per hour were separated. About 6 kilograms of the separated solids per hour, corresponding to the feeding of fresh $Al_2O_3$, were supplied to the electrolytic bath through conduit 10 and carbon-burning unit 14. The remainder of the separated solids were recycled into the fluidized-bed reactor 2 containing a total of 18 kilograms $Al_2O_3$, corresponding to a mean solids concentration of 4.5 kilograms per cubic meter of reactor volume.

The pressure loss in the entire system consisting of the fluidized-bed reactor 2 and the electrostatic precipitator 4 amounted to about 120 millimeters water.

A gas containing 100 milligrams dust per standard cubic meter and below 1 milligram hydrogen fluoride per standard cubic meter was discharged through the exhaust gas conduit 12.

EXAMPLE 2 (with reference to FIG. 2)

The experiment was carried out with the fluidized-bed reactor 2 shown in FIG. 1 and an electrostatic precipitator comprising two fields and four dust bins 5, 6, 7, and 8. The solids consisted of $Al_2O_3$ having the same properties as that used in Example 1.

An exhaust gas which contained 35 milligrams hydrogen fluoride per standard cubic meter and was at temperature of 80° C. was fed into the fluidized-bed reactor 2 at a rate of 5800 standard cubic meters per hour. $Al_2O_3$ at a rate of 14 kilograms per hour was fed by the feeder 16. The gas velocity in the fluidized-bed reactor 2 corresponded to a velocity of 3.3 meters per second in the empty reactor.

Water at a rate of 60 liters per hour was fed through conduit 13 to condition the solid-gas suspension for the separation in the electrostatic precipitator 4 and to reduce the temperature in the suspension to 60° C. The gas-solid suspension was a content of 175 grams solids per standard cubic meter was withdrawn through the suspension outlet 3. The solids were subjected to a fractionating separation in the electrostatic precipitator. The amount of solids separated in the dust bins 5, 6, 7, and 8 was 1000 kilograms per hour. Part of the separated solids at a rate which corresponds to the feed rate of fresh $Al_2O_3$ was supplied through conduit 10 to the electrolytic bath. Except for this part and the finest fraction collected in the dust bin 8 at a rate of 1.5 kilograms per hour, the collected solids were recycled into the fluidized-bed reactor through conduit 9. The fine-grained fraction collected in dust bin 8 and discharged through conduit 11 contained impurities in three times the mean concentration of the impurities in the entire quantity of $Al_2O_3$. In the entire quantity of oxide, the mean concentrations by weight were 4.5% F, 1.3% C, 0.3% S, and 0.25% $Fe_2O_3$. In the fraction collected in the dust bin 8, the concentrations by weight amounted to 12.5% F, 3.7% C, 0.9% S, and 0.7% $Fe_2O_3$. The fluidized-bed reactor 3 contained 12 kilograms $Al_2O_3$, corresponding to a concentration of 3 kilograms solids per cubic meter of the reactor volume. The pressure loss in the entire system consisting of the fluidized-bed reactor 2 and the electrostatic precipitator 4 amounted to about 110 millimeters of water. The exhaust gas leaving the exhausted gas conduit 12 contained less than 30 milligrams dust per standard cubic meter and 0.8 milligram flourine (as HF) per standard cubic meter.

We claim:

1. A process for removing hydrogen fluoride from a gas which comprises the combination of the following steps:
   a. introducing the gas into a fluidized bed reactor at a velocity of 1 to 5m/sec calculated for the empty reactor to form a gas-solid suspension in which the solids concentration decreases from bottom to top and wherein the solids have a particle size of 20 to 300 microns;
   b. extracting solids from said reactor substantially exclusively in an upward direction by entrainment with gas in a gas-solid suspension having a solids content of the order of 175 to 250 grams per cubic meter (STP) of the extracted suspension;
   c. separating the solids extracted in step (b) from the entraining gas without prior removal of the solids from the gas-solid suspension which has a dust resistivity adjusted to be below $10^{12}$ Ohm-cm by means of an electrostatic precipitator directly following the reactor and constituting the sole gas/solid separator downstream of the reactor;
   d. simultaneously with the separation of the solids from the entraining gas classifying the separated particles of the solids in said electrostatic precipitator into fine-grain and coarse-grain fractions;
   e. recycling the coarse-grain fraction into the fluidized bed reactor to form a circulating fluidized bed therein while discharging the fine-grain fraction upon which impurities in said gas preferentially adsorb; and
   f. discharging gas from said electrostatic precipitator after the separation of said particles therefrom as an exhaust gas containing at most about 1 $mg/m^3$ (STP) of fluorine as HF.

2. The process defined in claim 1 wherein the dust resistivity in step (c) is adjusted to below $10^{11}$ Ohm-cm.

3. The process defined in claim 2 wherein the gas-solid suspension is conditioned for the separation in step (c) by feeding water into the fluidized bed reactor.

4. The process defined in claim 1 wherein the temperature of the gas-solid suspension in step (a) is 40° to 85° C.

5. The process defined in claim 1 wherein the gas introduced into said fluidized bed reactor contains hydrogen fluoride and is introduced through at least one venturi inlet into said fluidized bed reactor.

6. The process defined in claim 1 wherein the resistance time of the solids in said fluidized bed reactor is increased by the incorporation of a baffle separator therein.

7. The process defined in claim 1 wherein the minimum solids concentration in the fluidized bed reactor is 2 to 10 kg per $m^3$ of the reactor volume.

* * * * *